Dec. 17, 1940.          C. C. GALLAGHER          2,225,169
                         WIRE ROPE CLAMP
                       Filed Jan. 22, 1940
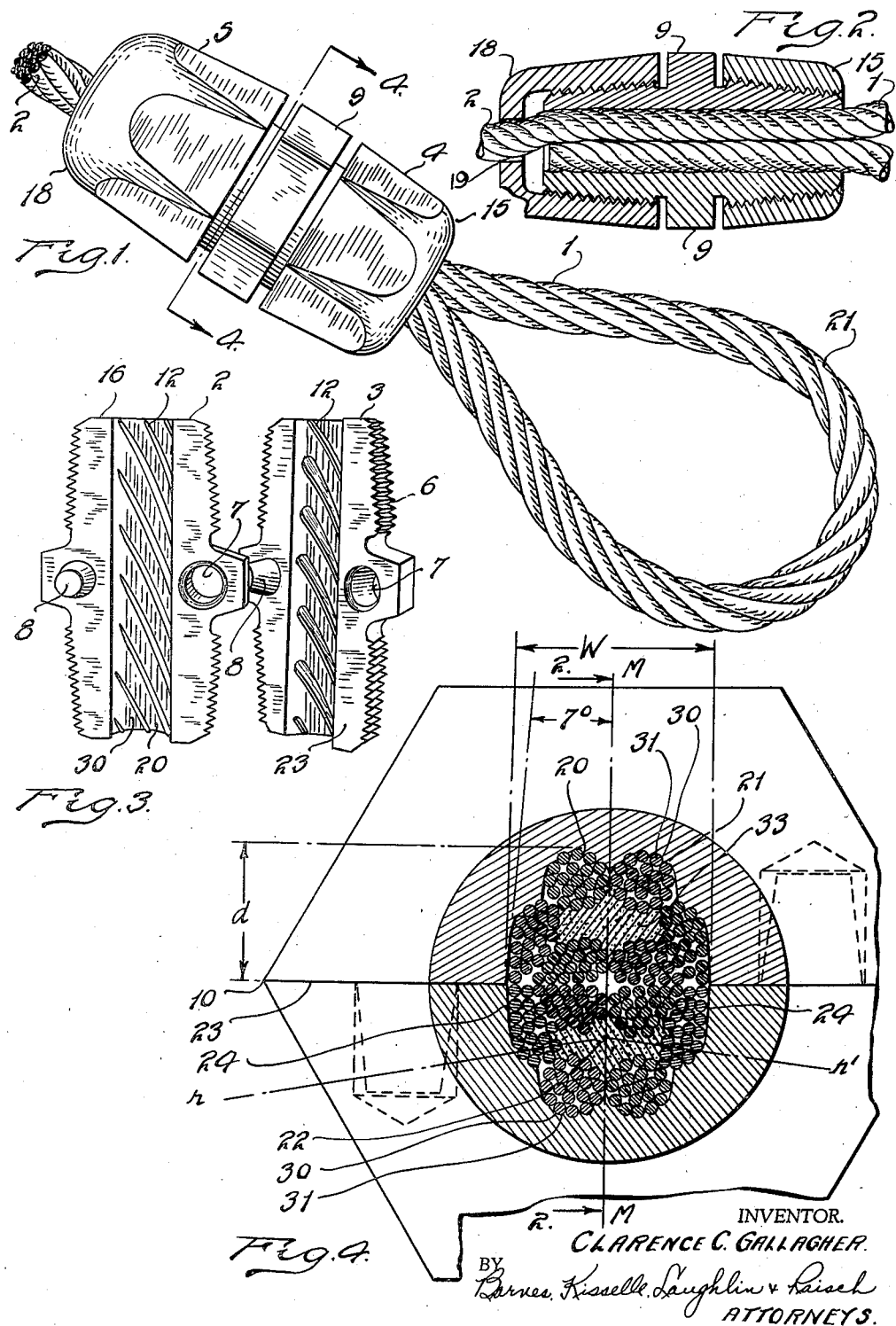
INVENTOR.
CLARENCE C. GALLAGHER.
BY
Barnes, Kisselle, Laughlin & Raisch
                              ATTORNEYS.

Patented Dec. 17, 1940

2,225,169

UNITED STATES PATENT OFFICE 2,225,169

WIRE ROPE CLAMP

Clarence C. Gallagher, Detroit, Mich.

Application January 22, 1940, Serial No. 314,895

5 Claims. (Cl. 24—124)

This invention relates to a wire rope clamp and is a continuation in part of my copending application Serial No. 269,662, filed April 24, 1939, Patent Number 2,217,400 granted Oct. 8, 1940.

A wire rope or cable is usually composed of several strands, each strand being composed of numerous small wires. The number of strands in the rope and the number of wires in each strand will vary according to the uses demanded. The small wires are usually twisted or twined together to form a strand of cylindrical proportions. This strand is then assembled with several like strands to form a wire rope.

In the holding or clamping of a wire rope or cable when extreme strain or load, even beyond the ultimate strength of the wire rope, is applied, it is necessary to have a clamping surface presented to the surface of the wire rope that will permit a maximum resistive effort to slippage. It has been proposed to make the clamping surfaces of the clamps an exact negative shape or form of the surfaces of the wire rope or cable, but this design has as its clamping limitations the necessity for maintaining the full diameter of the wire rope at all times, see the United States patent to Mobley 427,782.

It is an accepted fact that as strain is applied to the wire rope there is an appreciable loss in diameter until a point is reached where the outside diameter is the same or less than the original root diameter of the small grooves for the individual wires. These small grooves or serrations for the individual wires extend transversely of the larger spiral grooves which receive the strands. When this point is reached, which is quite below the ultimate strength of the wire rope, it is possible to pull the wire rope through such a clamp in a spiral motion as the strands slip in or slide along the spiral grooves in the clamps. This is possible because the loss in diameter allows the wire rope to lose its surface contact with the small serrations or grooves in the clamping members for the individual wires, therefore removing all obstacles in the way of preventing the spiral motion of the rope through its clamping members. The above facts have been proved by extensive experimentation and research in order to obtain a clamp which will hold a wire rope even when subjected to a load beyond the ultimate strength of the rope.

It is the object of this invention to produce a wire rope clamp which will overcome the defects of the clamps found in the prior art and which will clamp a wire rope with a clamping action that will hold even when the rope is subjected to a strain beyond the ultimate strength of the rope. This object is achieved without having the rope break in, or adjacent to, the clamp.

In the drawing:

Fig. 1 is an elevation showing the clamp applied to a wire rope.

Fig. 2 is a longitudinal section through the clamp and rope.

Fig. 3 is an exploded view of the clamping members.

Fig. 4 is a section along the line 4—4 of Fig. 1.

Referring more particularly to the drawing there is shown a wire rope 1. The clamp comprises two identical clamp members 2 and 3 and the end nut members 4 and 5. The clamp members 2 and 3 have their exterior surfaces threaded as at 6 and taper from the middle toward the ends. Each clamp is provided with a lug 8 and a socket 7. The lug of the clamp member 3 interengages the socket of the clamp member 2 and the lug of the clamp member 2 interengages the clamp member 3 in the socket 7.

The clamp members 2 and 3 when together are provided centrally with an integral polygonal ridge 9 which, by way of illustration, is a hexagonal in circumference. Each clamp member 2 and 3 has formed thereon one half of the hexagonal ridge 9, that is, each carries three full sides of the hexagonal ridge. The joint in the two halves of the hexagonal ridge 9 runs from one apex 10 to the apex opposite thereof. This is advantageous because the joint between the two halves of the hexagonal ridge 9 when drawn tightly together is substantially invisible. A further advantage of making the two clamp members so that the hexagonal ridge 9 is split through two opposite apices is that this facilitates manufacture where the clamp members are, for example, drop forged or cast. In casting or forging draft is necessary so that the clamp members can be removed from the mold in casting, or the die in forging. This draft, which in a well accepted term in the casting art, should be at least seven degrees. Where the hexagonal ridge is formed, as described above and shown particularly in Fig. 4, this draft is considerably more than seven degrees.

The nut 4 is tapered inwardly from the center toward the end of the clamp. The nut 4 when fully screwed down forms a tight, hardly discernible joint with the hexagonal ridge 9. The length of the nut 4 is equal to, and preferably slightly longer than the distance from the side of the hexagonal ridge 9 to the end of the clamp members 2 and 3. Because of this the outer curved end 15 of the nut is either flush with or projects beyond the end 16 of the clamp members 2 and 3, thus the nut 15 serves as a shield to prevent injury to the hands or clothing of the individual manipulating the rope 1.

The nut 5 is also tapered from the middle toward the end and when fully screwed down has a close joint with the hexagonal ridge 9, but it should be noted that the nuts 4 and 5 when screwed tightly against the hexagonal ridge 9 have their surfaces flush therewith. Thus, the clamp when fully assembled presents a smooth surface from one end to the other and presents no sharp or rough edges which are likely to injure the hands or clothing of the individual handling the rope.

The center hexagonal ridge 9 serves an important function in the assembly of the clamp to the rope. In assembly the rope is placed in the grooves 12 and the clamp members placed in a vise so that the vise grips the opposed faces of the hexagonal ridge. By means of the vise acting on the ridge 9, the clamps are brought tightly together without in any wise mutilating the threads of the clamp. While thus held in the vise the nuts 4 and 5 can be screwed on to the clamp members.

The nut 5 when fully screwed down extends beyond the outer end of the clamp members 2 and 3 and is provided with a shield portion 18 having a hole 19 therein having a diameter equal to that of the size rope for which the clamp is designed. The hole 19 is positioned in alignment or centered with the longitudinal axis of the clamp. This shield 18 not only gives additional strength to the nut 5 but also centers the rope 1 as it projects from the clamp assembly. The fact that the rope 1 runs out of the clamp centrally or aligned with the longitudinal axis of the clamp prevents the clamp from cocking when the rope is in use. Further, the shield 18 shields the dead end of the rope. If the rope is wire rope with sharp end fibers, the shield protects the handler against injury therefrom. The shield 18 also prevents the ingress of water into the clamp.

The method of clamping, while applicable to one or more wire ropes, is more easily described with the use of two wire ropes and preferably consists of laying one wire rope on top of the other and clamping them together with clamping members 2 and 3 upon which are screwed the tapered threaded nuts 4 and 5.

Each of the clamping members 2 and 3 is provided with a longitudinal groove generally designated 12. These grooves are purposely designed to reform the round strands to a shape other than round when the rope is clamped in the clamp. The depth $d$ of each groove 12 is less than the external diameter of the wire rope and the width $w$ of each groove 12 at surface 23 is equal to or slightly larger than the external diameter of the wire rope. The bottom portion of the groove is arcuate and formed about a center 22 and extends approximately 100° through angle $r$, 22, $r'$. The bottom of each groove 12 between $r$ and $r'$ is provided with spiral grooves 20 which receive the spiral strands 21 of the wire rope and with serrations or grooves 30 which cut across grooves 20 and receive the individual wires 31 of each strand. The surface 24 of each groove 12 from points $r$ and $r'$ to the adjoining face 23 of the clamp is smooth and not serrated. It is, of course, understood that the clamping members 2 and 3 are identical and the description of one applies equally well to the other. When clamp members 2 and 3 are together, grooves 12 cooperate to form an opening of somewhat elliptical shape for receiving two ropes one on the other, or the rope plus the end folded back on it as shown in Fig. 2. The major axis of the opening is two $d$ and the minor axis is $w$.

The sides 24 of the groove on each clamping member 2 and 3 from radius $r$ and $r'$ to the surface 23 are flat surfaces which can be perpendicular to the surface 23 but preferably flare outwardly at a small angle from the major axis M—M. For purposes of description rather than by way of limitation, this angle is shown as about 7°, Fig. 4.

When the nuts 4 and 5 are screwed tightly on the clamping members 2 and 3, as shown in Fig. 2, the ropes which are placed one upon the other will be squeezed together and forced to conform with the surface contour of the grooves 12 of the clamping members. This will cause each of the strands of the rope to change its rounded form to various other shapes such as illustrated in the drawing, Fig. 4. Somewhere in the length of the clamping member each strand will have considerably changed its shape to conform to each of the shapes illustrated in Fig. 4, because each spiral groove 20 preferably extends spirally through 360° in running from one end of clamping members 2, 3 to the other. Any effort to again change the shapes of the strand after assembly in the clamping members will be met with great resistance and demand more pull than the tensile strength of the wires. It can be readily seen that this condition presents an extreme resistance to slippage in either a spiral or longitudinal direction through the clamping members when a pull or load is applied to the wire rope thus clamped.

As is customary, the rope 1 is provided with the usual core 33. This core can be made from metal, either in the form of a solid core or a wire strand core, or of hemp or other fibrous material.

I claim:

1. A clamp for a wire rope or cable comprising a plurality of clamping members provided with externally threaded surfaces adapted to be fitted together over a wire rope, a nut screwed over the threaded external surfaces of the clamp members for drawing the same tightly down upon the rope and into clamping engagement therewith, an internal main groove extending throughout the length of each clamping member, auxiliary spiral grooves in the face of the main grooves arranged to receive the spiral strands of the rope, the main grooves cooperating when the clamps are together to form an approximately elliptical opening, the spiral grooves when the clamps are together running spirally and intermittently through at least about 360°, a substantial portion of the top and bottom sides of the opening on each side of its major axis being generally round in shape and having the above-mentioned spiral grooves therein to conform to the surface contour of the wire rope and a substantial portion of the surface of the opening on each side of the minor axis of the opening being generally flat whereby when the clamping members are drawn together each of the strands of the wire rope somewhere in the length of the clamp is distorted similarly to every other strand of the rope.

2. A clamp for a wire rope or cable comprising a plurality of clamping members provided with externally threaded surfaces adapted to be fitted together over a wire rope, a nut screwed over the threaded external surfaces of the clamp members for drawing the same tightly down upon the rope and into clamping engagement therewith, an internal main groove extending throughout the length of each clamping member, auxiliary spiral grooves in the face of the main grooves arranged to receive the spiral strands of the rope, the main grooves cooperating when the clamps are together to form an approximately elliptical opening, the spiral grooves when the clamps are together running spirally and intermittently through at least about 360°, a substantial portion of the top and bottom sides of the opening on each side of its major axis being arcuate in shape and having the abovementioned spiral grooves therein and having a radius approximately equal to the radius of the rope which the clamp is adapted to receive whereby the top and bottom sides of the opening conform to the surface contour of the wire rope and a substantial portion of the surface of the opening on each side of the minor axis of the opening being generally flat whereby when the clamping members are drawn together some of the strands are flattened and each of the strands of the wire rope somewhere in the length of the clamp is distorted similarly to every other strand of the rope.

3. A clamp for a wire rope or cable having a plurality of spiral strands each consisting of a plurality of individual wires comprising in combination a pair of clamping members provided with externally threaded surfaces adapted to be fitted together over two lengths of said wire rope placed one upon the other, a nut screwed over the threaded external surfaces of the wire clamping members for drawing the same tightly down upon the ropes and into clamping engagement therewith, an internal main groove extending throughout the length of each clamping member, auxiliary spiral grooves in the face of the main grooves arranged to receive the spiral strands of the rope, each of the main grooves receiving a length of wire rope and cooperating when the clamps are together to form an approximately elliptical opening having a major diameter less than twice the outer diameter of the rope, the said spiral grooves when the clamps are together extending spirally and intermittently around the said elliptical opening, a substantial portion of the top and bottom sides of the opening on each side of its major axis being generally round in shape to conform to the surface contour of the wire rope and a substantial portion of the surface of the opening on each side of the minor axis of the opening being generally flat whereby when the clamping members are drawn together the adjacent contacting strands of the two lengths of rope are flattened and each of the strands somewhere in the length of the clamp is distorted similarly to every other strand of the rope and whereby the pull on the rope tends to turn one length of rope at the contacting surface in the opposite direction from the other length.

4. A clamp for a wire rope or cable having a plurality of spiral strands each consisting of a plurality of individual wires comprising in combination a pair of clamping members provided with externally threaded surfaces adapted to be fitted together over two lengths of said wire rope placed one upon the other, a nut screwed over the threaded external surfaces of the wire clamping members for drawing the same tightly down upon the ropes and into clamping engagement therewith, an internal main groove extending throughout the length of each clamping member, auxiliary spiral grooves in the face of the main grooves arranged to receive the spiral strands of the rope, each of the main grooves receiving a length of wire rope and cooperating when the clamps are together to form an approximately elliptical opening having a major diameter less than twice the outer diameter of the rope, the said spiral grooves when the clamps are together extending spirally around the said elliptical opening, a substantial portion of the top and bottom sides of the opening on each side of its major axis being arcuate and having a radius approximately the same as that of the rope which the clamp is adapted to receive whereby the top and bottom sides of the opening conform to the surface contour of the wire rope and a substantial portion of the surface of the opening on each side of the minor axis of the opening flare outwardly at a small angle with respect to the major axis of the opening whereby when the clamping members are drawn together the adjacent contacting strands of the two lengths of rope are flattened and each of the strands somewhere in the length of the clamp is distorted similarly to every other strand of the rope and whereby the pull on the rope tends to turn one length of rope at the contacting surface in the opposite direction from the other length.

5. A clamp for a wire rope or cable having a plurality of spiral strands each consisting of a plurality of individual wires comprising in combination a pair of identical clamping members provided with externally threaded surfaces adapted to be fitted together over two lengths of said wire rope placed one upon the other, a nut screwed over the threaded external surfaces of the wire clamping members for drawing the same tightly down upon the ropes and into clamping engagement therewith, an internal main groove extending throughout the length of each clamping member, each of the main grooves receiving a length of wire rope and cooperating when the clamps are together to form an approximately elliptical opening having a major diameter less than twice the outer diameter of the rope, a substantial portion of the top and bottom sides of the opening on each side of its major axis being generally round in shape and having auxiliary spiral grooves in the face of the main grooves to conform to the surface contour of the wire rope and a substantial portion of the surface of the opening on each side of the minor axis of the opening being generally flat and flaring outwardly from the rounded portion of the groove to the adjoining faces of the clamping members whereby when the clamping members are drawn together the adjacent contacting strands of the two lengths of rope are flattened and the strands of the rope are distorted from their normal sectional contour and whereby the pull on the rope tends to turn one length of rope at the contacting surface in the opposite direction from the other length.

CLARENCE C. GALLAGHER.